(12) United States Patent
Capurso et al.

(10) Patent No.: US 7,009,524 B2
(45) Date of Patent: Mar. 7, 2006

(54) SHELF TALKER HAVING SHORT AND LONG TERM INFORMATION

(75) Inventors: Robert G. Capurso, Bergen, NY (US); James M. Papa, Rochester, NY (US); John I. Kilburn, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 113 days.

(21) Appl. No.: 10/633,714

(22) Filed: Aug. 4, 2003

(65) Prior Publication Data

US 2005/0030157 A1 Feb. 10, 2005

(51) Int. Cl.
*G08B 5/00* (2006.01)

(52) U.S. Cl. .................... 340/815.4; 40/654

(58) Field of Classification Search ............ 340/815.4, 340/5.91; 40/649, 654, 657, 661
See application file for complete search history.

(56) References Cited

U.S. PATENT DOCUMENTS

| | | | |
|---|---|---|---|
| 4,435,047 A | | 3/1984 | Fergason |
| 5,448,226 A | | 9/1995 | Failing, Jr. et al. |
| 5,771,005 A | | 6/1998 | Goodwin, III |
| 5,838,286 A | * | 11/1998 | Pfeiffer et al. ............... 345/30 |
| 5,898,383 A | * | 4/1999 | Forsythe .................... 340/5.91 |
| 6,021,395 A | * | 2/2000 | Goodwin, III ............... 705/20 |
| 6,031,585 A | * | 2/2000 | Stevens, III ................... 349/1 |
| 6,184,834 B1 | * | 2/2001 | Utsumi et al. ............... 343/702 |
| 6,266,905 B1 | * | 7/2001 | Forsythe et al. .............. 40/657 |
| 6,269,342 B1 | * | 7/2001 | Brick et al. ................... 705/20 |
| 6,271,807 B1 | * | 8/2001 | Kayser et al. ................ 345/2.1 |
| 6,621,407 B1 | * | 9/2003 | Goodwin, III ............. 340/5.91 |
| 6,622,410 B1 | * | 9/2003 | Wilkes et al. ................. 40/654 |
| 2001/0054005 A1 | | 12/2001 | Hook et al. |

FOREIGN PATENT DOCUMENTS

EP  1 258 860 A1  11/2002

OTHER PUBLICATIONS

U.S. Appl. No. 10/134,185 by Stephenson et al., filed Apr. 29, 2002.

* cited by examiner

*Primary Examiner*—John Tweel, Jr.
(74) *Attorney, Agent, or Firm*—Thomas H. Close; Kathleen Neuner Manne

(57) ABSTRACT

A shelf talker for displaying short and longer term information includes a backplane including a plurality of electrical conductors; a plurality of single character display chips mounted on the backplane in electrical contact with the electrical conductors for displaying the short term information; and a graphic overlay located over the backplane bearing the longer term information and defining apertures for displaying the short term information displayed by the single character display chips.

23 Claims, 8 Drawing Sheets

SHELF TALKER HAVING SHORT AND LONG TERM INFORMATION

FIELD OF THE INVENTION

The present invention relates to shelf talkers and shelf talker display systems.

BACKGROUND OF THE INVENTION

Retailers are increasingly turning to electronic shelf label (ESL) systems to handle the price changing needs in their stores. Along with ESL systems, integrated within the shelf rails, are the use of larger shelf talkers used to attract the customers attention by portraying a special item or price. U.S. Pat. No. 5,448,226, issued Sep. 5, 1995 to Failing, Jr., et al. shows such a system where a shelf talker is placed at a location where an item is on sale or of special interest to the customer. Failing refers to the shelf talkers as cards or printed material attached at a particular item location. Failing claims a management system whereby a shelf talker is detected upon insertion into an ESL, indicating to a database that a shelf talker has been deployed at that location.

The shelf talker disclosed by Failing is a printed card that must be removed and a new card printed when the information to be displayed, such as the item price, changes. This process is not only costly from a printing standpoint, but also labor intensive.

U.S. Pat. No. 5,771,005, issued Jun. 23, 1998 to Goodwin, III discloses a shelf talker that is described as an auxiliary display attached to an ESL. It electrically connects to the ESL by way of a connecting header and associated rows of connector pins. Goodwin's auxiliary display is described as an LCD with silk screening for color. One problem with using a conventional LCD display is the thickness of the display. Goodwin illustrates his LCD displays as rather thick allowing for the glass layers customarily found in liquid crystal displays. In one claim, Goodwin even describes two displays back-to-back and protruding orthogonally from the ESL. This makes for a very thick and rigid display jutting out from the ESL making it susceptible to breakage due to collisions from carts and customers. Conventional LCD displays also need continuous power in order to display the information thereby consuming the power in the battery provided with the shelf talker.

Another problem with the shelf talker disclosed by Goodwin is that the static information, such as UPC and other long term product information is screen printed on the auxiliary display. It is not convenient for stores to custom screen print their own shelf talkers to match the items and special pricing information.

There is therefore a need for an improved shelf talker that avoids the problems noted above.

SUMMARY OF THE INVENTION

The need is met according to the present invention by providing a shelf talker for displaying short and longer term information that includes a backplane including a plurality of electrical conductors; a plurality of single character display chips mounted on the backplane in electrical contact with the electrical conductors for displaying the short term information; and a graphic overlay located over the backplane bearing the longer term information and defining apertures for displaying the short term information displayed by the character chips.

ADVANTAGES

The shelf talker of the present invention can be provided as a thin flexible electronically writable shelf talker that is easily manufacturable by picking and placing the single bistable liquid crystal character chips on a flexible backplane. The chips require no additional power once written and the shelf talker maintains the display of information until written again. The advantage of the individual character chips is that they can be manufactured in quantity prior to the design of the backplane of the shelf talker, and later placed on a custom fabricated back plane to yield any one of a number of different configurations for the shelf talker.

The printable graphic overlay that is adhered to the backplane, which can be printed locally and may have long term static information such as store icons, UPC, static text and other product or non-product related information. This provides a simple way to address the needs of retailers who desire varying formats on their shelf talkers, whether product specific or generic, with no effect on the fabrication of the characters. A large variety of shelf talker layouts can be designed and only the backplane and trace paths need to change. Manufacturing of the bistable character display chips are independent of any layout configuration. Short term information such as price changes, cost per unit, and savings information can be changed electronically by way of an electronic writer.

DETAILED DESCRIPTION OF THE INVENTION

Figure 1:
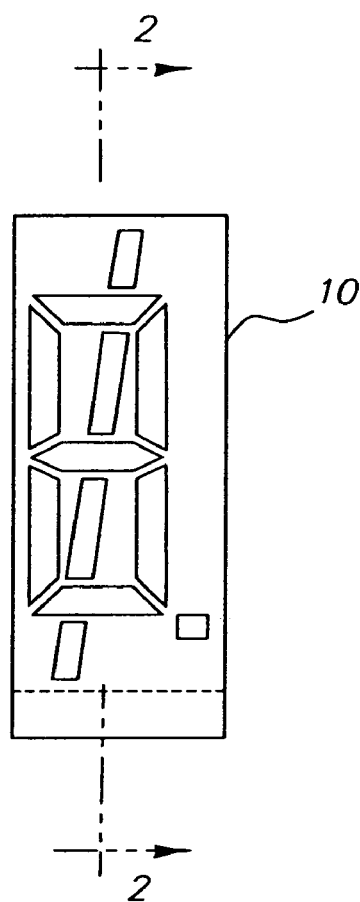
FIG. 1 is a top view of a single character display chip according to the present invention.
Figure 2:
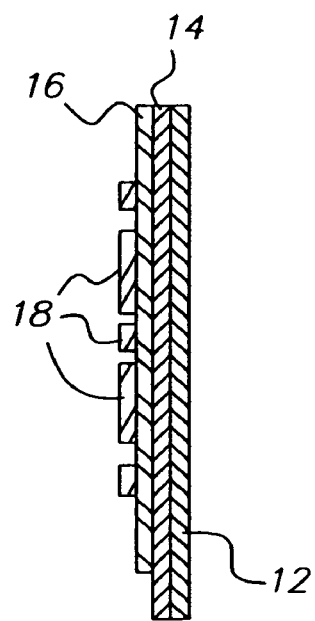
FIG. 2 is a cross sectional view of a single character display chip taken along lines 2—2 in FIG. 1.

Referring to FIGS. 1 and 2, a single character display chip 10 is constructed by forming a conductive common electrode layer 14 on a substrate 12. A layer of bistable liquid crystal material 16 is deposited, for example by roll coating, on the conductive common electrode layer 14, leaving an exposed area of layer 14 for making electrical contact. Electrically conductive character segments 18 are then formed, for example by thick film printing on the bistable liquid crystal layer 16. The character segments 18 may be arranged, for example to produce numeric characters 0–9 as well as a slash, a decimal point, a dollar sign, and a cent sign. The optical state of the bistable liquid crystal material 16 between the character segments 18 and the common electrode layer 14 can be changed by selectively applying drive voltages to the character segments and the common electrode layer 14. Once the optical state of the bistable liquid crystal material 16 has been changed, it remains in that state indefinitely without further power being applied to the electrodes. The single character display chip 10 can be made as shown for example in U.S. Ser. No. 10/134,185, filed Apr. 29, 2002 by Stephenson et al., which is incorporated herein by reference.

Figure 3:
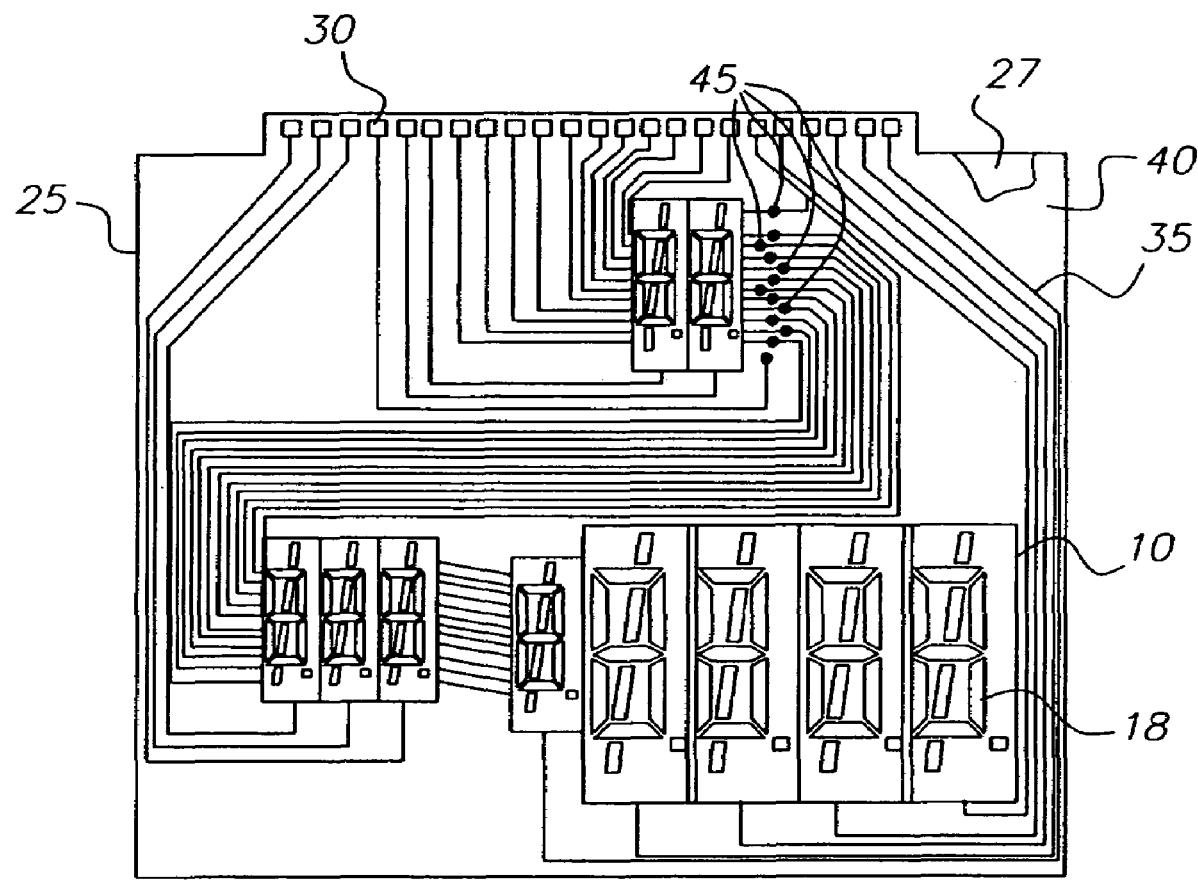
FIG. 3 is a top view of a backplane used with the single character display chips according to the present invention.

Referring to FIG. 3, a backplane generally designated 25, comprises a flex circuit substrate 27 on which conductive traces 35 are formed. An insulator layer 40 is formed over conductive traces 35. Exposed contact pads 30 at the top of the backplane 25 are used for electrical contact to a writing device. Additional exposed contact dots 45 in the insulator layer 40 provide electrical contact locations with the conductive traces 35 to contact the printed conductive character segments 18 of single character display chip 10. The single character display chips 10, several of which are shown attached to the backplane 25, are attached by conductive adhesive between contact dots 45 and the printed conductive character segments 18 of single character display chip 10. The conductive adhesive can be applied as individual spots, or as a single layer of anisotropically conductive adhesive as is known in the art.

Figure 4:
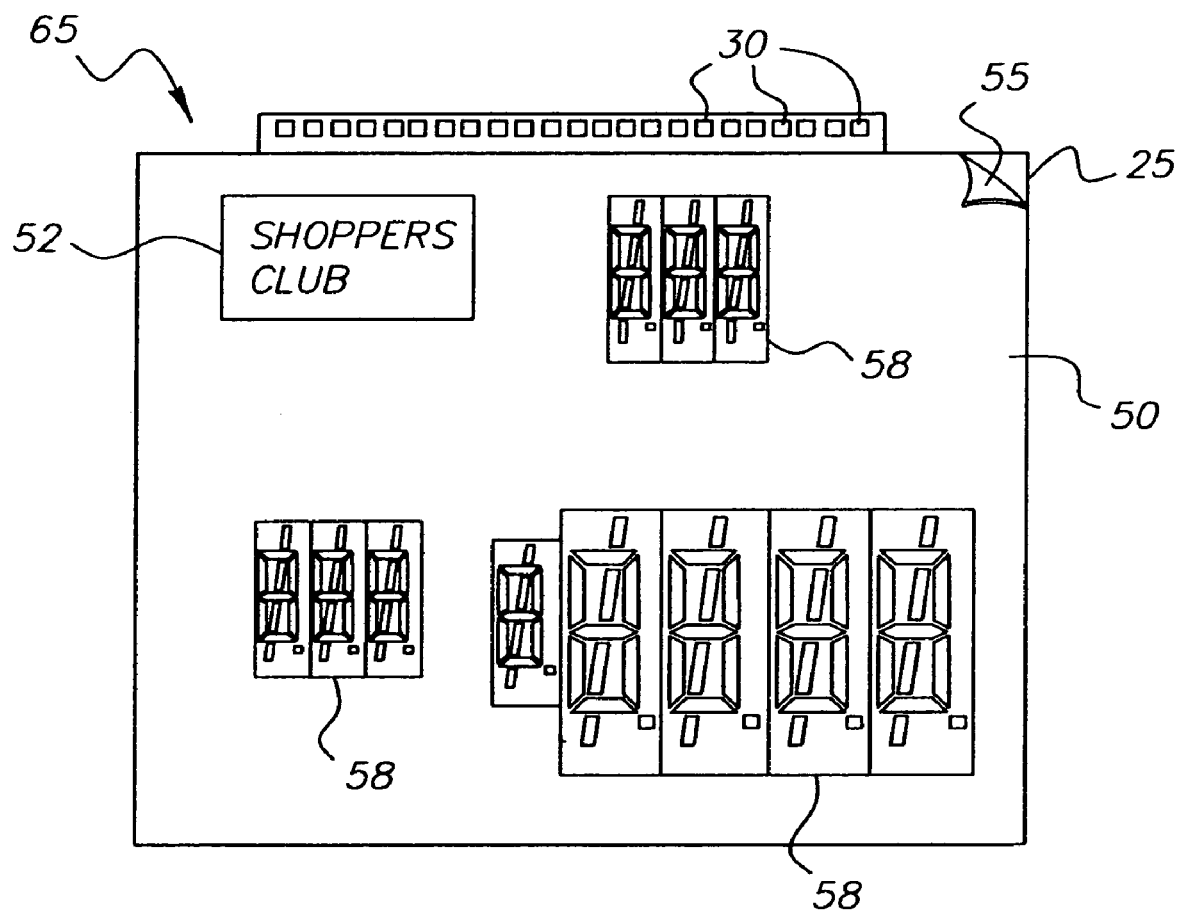
FIG. 4 is a top view of a completed shelf talker according to the present invention.

FIG. 4 shows a completed shelf talker 65. A printable graphic overlay 50 is attached to the backplane 25 with an adhesive backing 55 on the backside of the printable graphic overlay 50. Openings 58 are provided in the printable graphic overlay to expose the single character display chips 10. Long term printed information 52 such as a store logo and other information may be pre-printed on the graphic overlay 50.

Figure 5:
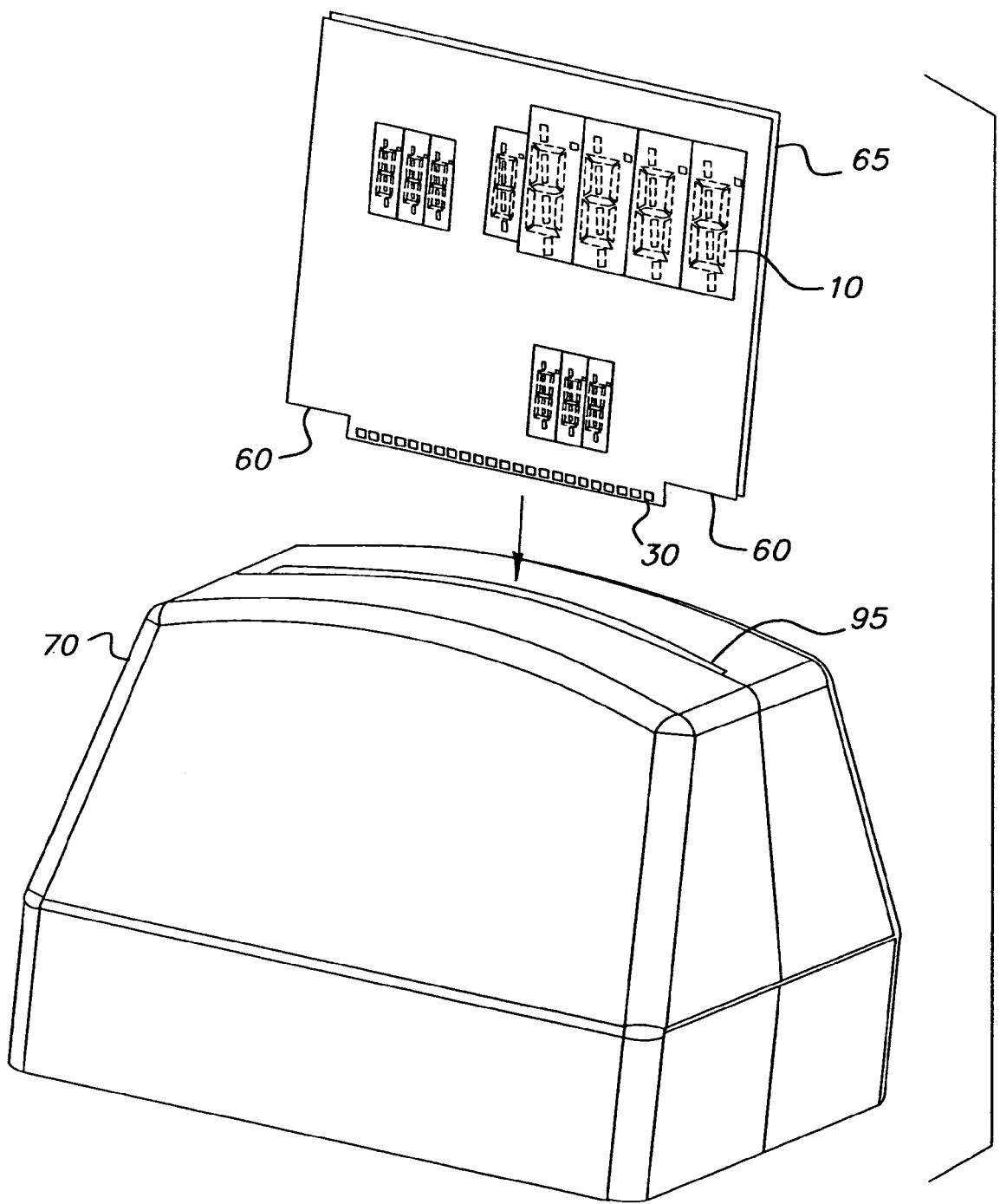
FIG. 5 is a perspective view of a shelf talker writer used to electrically change the short term information according to the present invention.

A shelf talker writer 70 shown in FIG. 5 is used to electrically change the short term information on the single character display chips 10 of shelf talker 65. The shelf talker writer 70 is electrically connected to a power supply and database having short term pricing information. The shelf talker 65 is inserted into slot 95 of writer 70 with the contacts 30 of shelf talker 65 facing downward.

Figure 6:
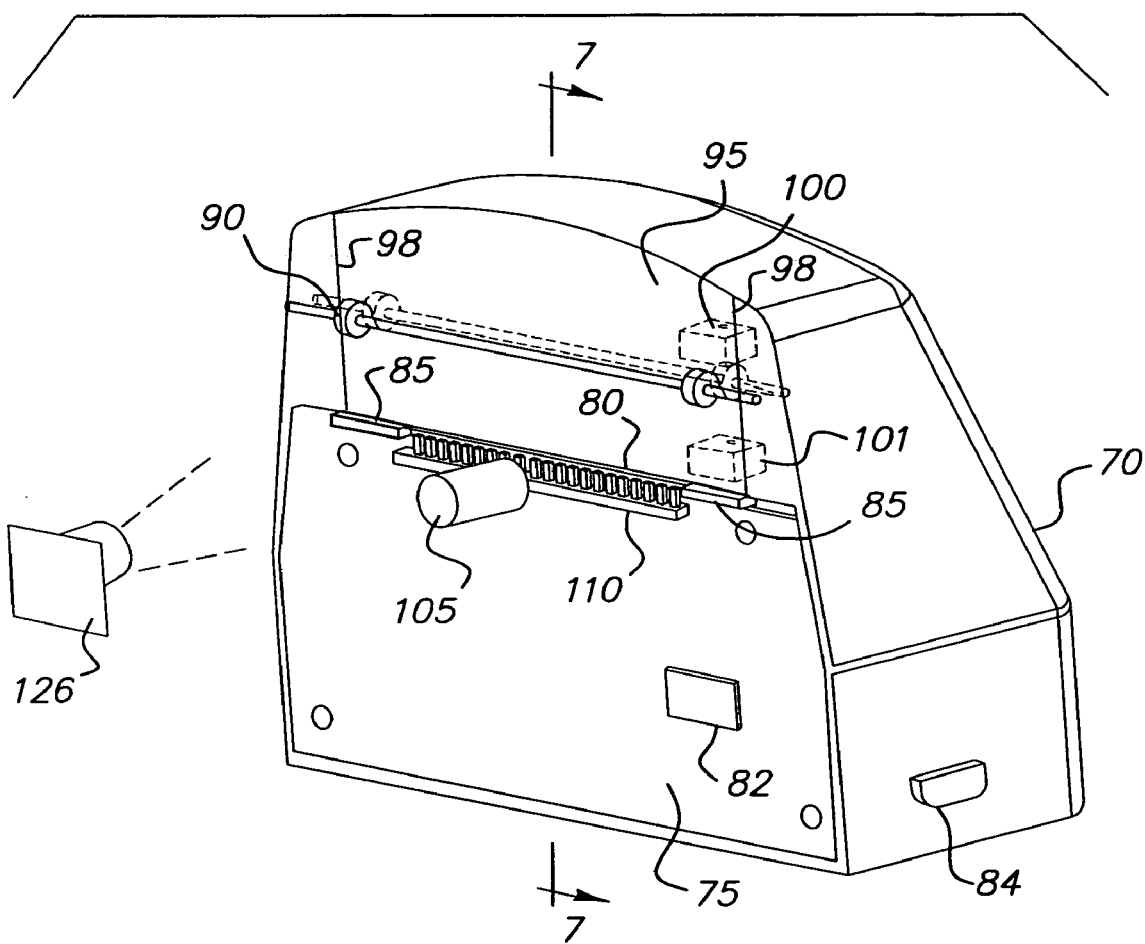
FIG. 6 is a cut-away view of the shelf talker writer of FIG. 5.

In a cut-away of the shelf talker writer 70, FIG. 6 shows a slot 95 with alignment edges 98 and positioning surfaces 85. Also shown is a shelf talker presence sensor 100 which provides an electrical signal to indicate the presence of a shelf talker 65, which then drives the roller drive system 90 to move the shelf talker 65 downward into the shelf talker writer 70. A second home sensor 101 provides an electrical signal to indicate a seated position of edges 60 of shelf talker 65 to positioning surfaces 85 of writer 70, which in turn shuts off the roller drive assembly 90. The shelf talker writer 70 includes a circuit board 75 with contact pads 80 aligned with contacts 30 of the shelf talker 65. Circuit board 75 includes a drive circuit 82 that supplies drive signals to the contact pads 80. The drive circuit is supplied with write data via a serial port 84 from an external source such as a personal computer as described below.

Figure 7:
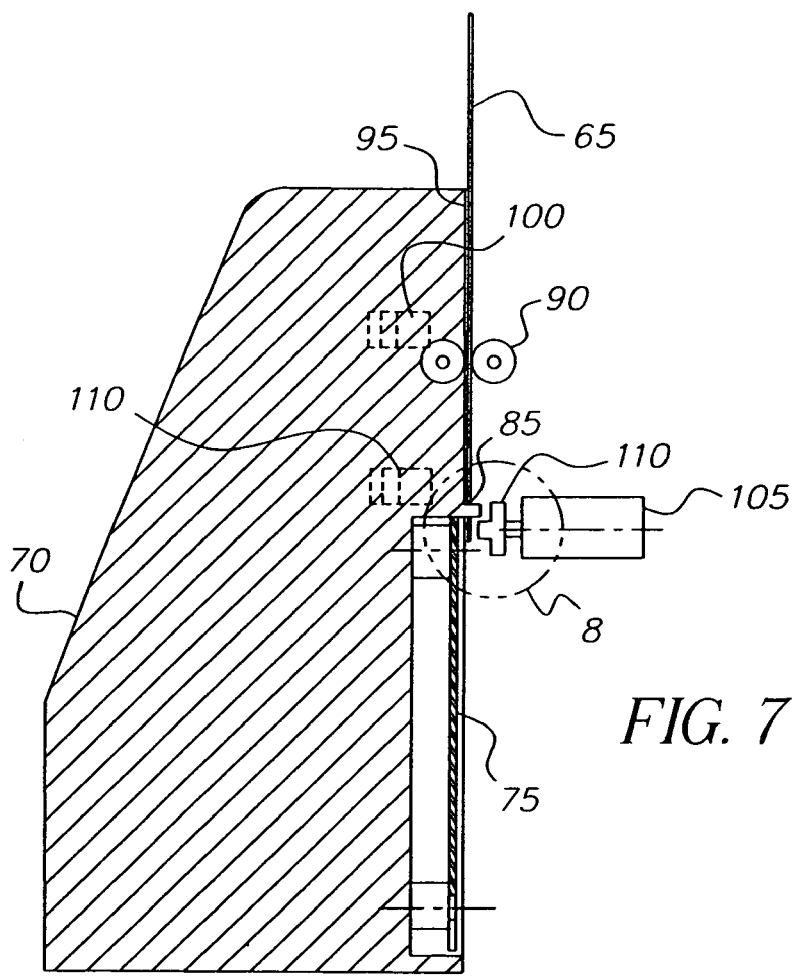
FIG. 7 is a cross sectional view of the shelf talker writer taken along lines 7—7 of FIG. 6.
Figure 8:
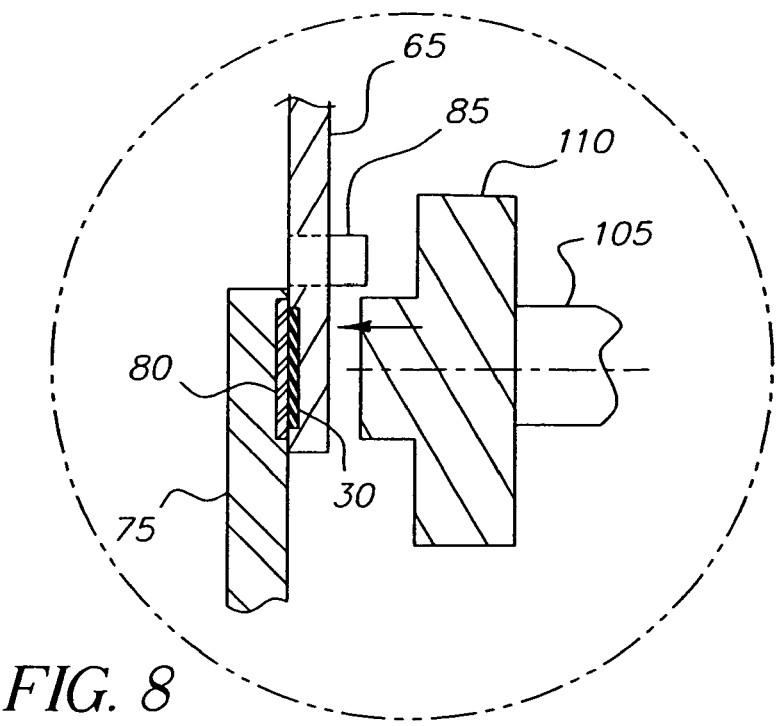
FIG. 8 is a partial an enlarged view of FIG. 7 showing the electrical contacts used to write to the shelf talker.

FIG. 7 shows a partial cross section from FIG. 6 with a shelf talker 65 seated in position. An enlarged view of the interface area in FIG. 8 shows the contact pads 30 of shelf tag 65 in position adjacent to the contact pads 80 of circuit board 75. Once shelf talker 65 is seated on positioning surfaces 85, a solenoid 105 drives block 110 forward creating firm contact between contact pads 80 and contacts 30 of the shelf talker 65. Electrical signals are then sent to change the short term information on single character display chips 10. After the writing process is completed, the roller drive assembly drives the shelf talker 65 upward to the original inserted position for the store clerk to remove. Once written, the shelf talker 65 can be attached to any shelf pricing system by way of a clip as is known in the art.

Figure 9A:
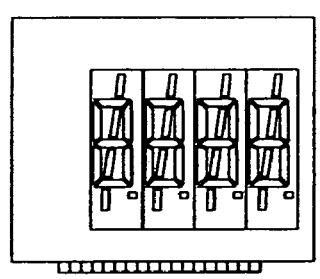
FIG. 9 is a schematic block diagram of a shelf talker system according to one embodiment of the present invention, split into FIG. 9A and FIG. 9B for legibility.
Figure 9A:
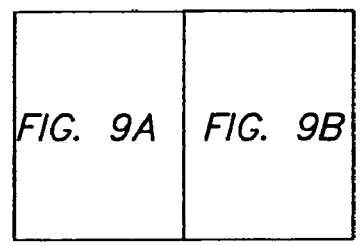
Figure 9A:
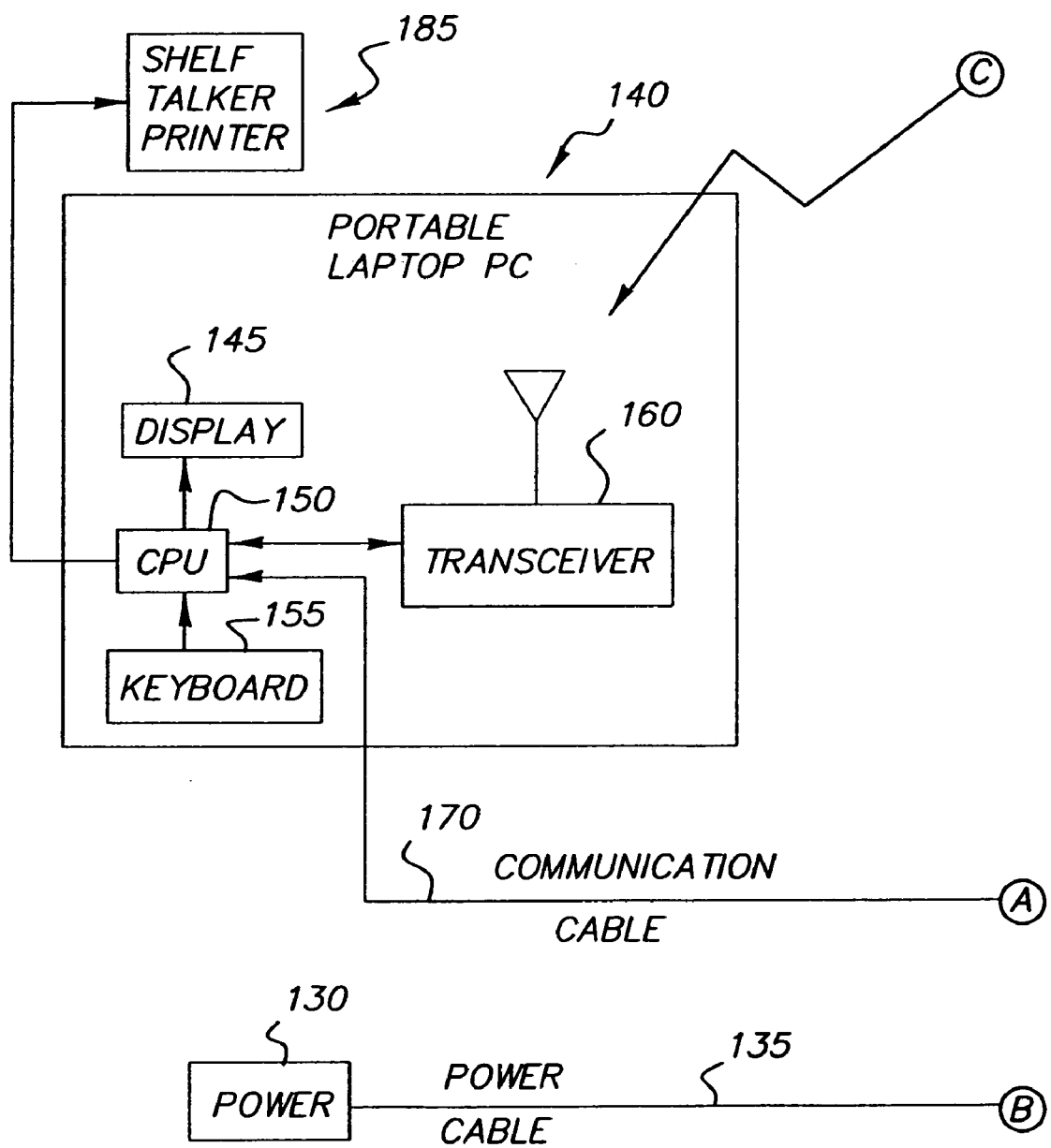
Figure 9B:
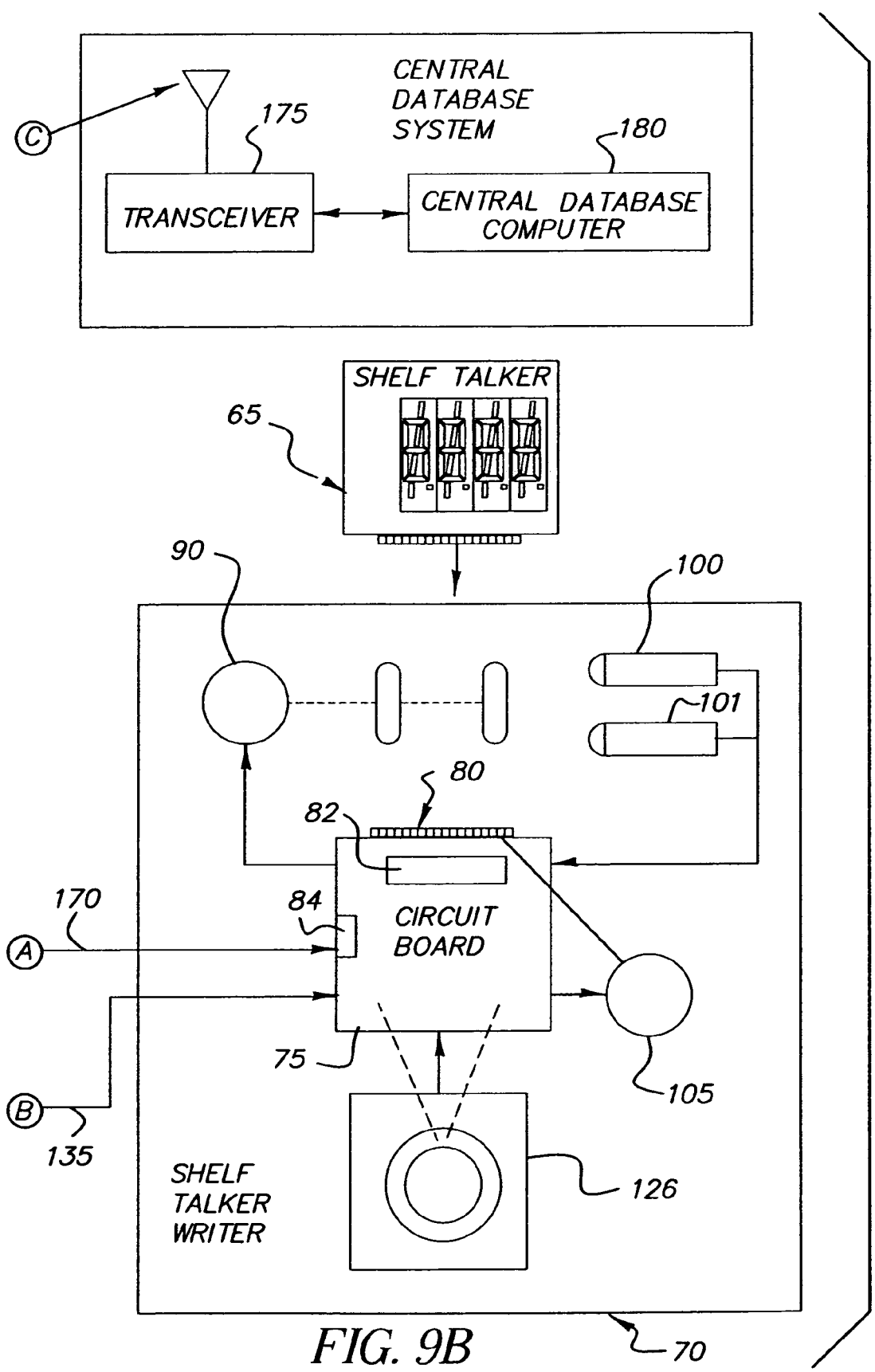

Referring to FIG. 9, split into FIGS. 9A and 9B for legibility, a shelf talker system using a shelf talker of the present invention includes a database transceiver 175 that sends information derived from a central database computer 180, to a personal computer transceiver 160 in the portable personal computer 140. Commands from the keyboard interface 155 and shown on the display 145 are sent to the shelf talker writer 70 by way of the laptop central processing unit 150 through communication cable 170. Power 130 is supplied to the shelf talker writer through power cable 135 to circuit board 75 for powering the sensors 100 and 101, roller drive motor 90, solenoid 105, and a digital camera 126 located in the shelf talker writer 70. Upon writing the shelf talker 65, the digital camera 126 sends an image back to the portable personal computer 140 through communication cable 170 where character recognition software compares the actual written characters to the database. If the data is inconsistent, an error message is posted on display 145.

Also shown in FIG. 9 is a printer 185 used to print long term information 52 on shelf talker 65. The data originating from the central database 180 is sent to the portable personal computer 140, which then sends the data to the printer 185. The printing of long term information can thus be done locally and customized with individual store related information.

The invention has been described in detail with particular reference to certain preferred embodiments thereof, but it will be understood that variations and modifications can be effected within the spirit and scope of the invention.

PARTS LIST 10 single character display chip
12 substrate
14 common electrode layer
16 bistable liquid crystal
18 electrically conductive character segments
25 backplane
27 flex circuit substrate
30 backplane contact pads
35 conductive traces
40 insulator layer
45 contact dots
50 printable graphic overlay
52 long term printed information
55 adhesive backing
58 opening in printable graphic overlay
60 shelf talker edge
65 shelf talker
70 shelf talker writer
75 circuit board
80 circuit board contact pads
82 drive circuit
84 serial port
85 positioning surfaces
90 roller drive system
95 slot
98 slot edge
100 presence sensor
101 home sensor
105 solenoid
110 block
126 camera
130 power 135 power cable
140 portable personal computer
145 display
150 central processing unit
155 keyboard interface
160 personal computer transceiver
170 communication cable
175 database transceiver
180 central database computer
185 printer

What is claimed is:

1. A shelf talker for displaying short and longer term information, comprising:
   a) a backplane including a first insulating layer, a plurality of electrical conductors and associated electrical contacts formed on the first insulating layer, and a second insulating layer arranged over the electrical conductors and defining apertures for making electrical contact to the electrical conductors;
   b) a plurality of single character chips for displaying short term information, each character chip including an unpatterned first conductor layer, a patterned conductor layer defining a plurality of character elements, and a layer of cholesteric bistable liquid crystal material located between the first and second conductor layers, the single character chips being mounted on the backplane in selected locations such that the conductor elements make electrical contact with the electrical conductors through the apertures; and
   c) a graphic overlay located over the backplane bearing longer term information and defining apertures for displaying the short term information displayed by the character chips.

2. A shelf talker writer for writing short term information onto a shelf talker having a bistable electronically writable display having electrical conductors, comprising;
   a) an arrangement of electrical contacts for making contact with the electrical conductors;
   b) a driver for applying drive signals to the electrical contacts to cause the display to display the short term information; and
   c) a digital camera for capturing an image of the display to be used to verify that the short term information was correctly written to the display.

3. A shelf talker for displaying short and longer term information, comprising:
   a) a backplane including a first insulating layer, a plurality of electrical conductors and associated electrical contacts formed on the first insulating layer, and a second insulating layer arranged over the electrical conductors and defining apertures for making electrical contact to the electrical conductors;
   b) a plurality of display chips comprised of multiple characters for displaying short term information, each display chip including an un-patterned first conductor layer, a patterned conductor layer defining a plurality of character elements, and a layer of cholesteric bistable liquid crystal material located between the first and second conductor layers, the multiple character display chip being mounted on the backplane in selected locations such that the character elements make electrical contact with the electrical conductors through the apertures; and
   c) a graphic overlay located over the backplane bearing longer term information and defining apertures for displaying the short term information displayed by the display chips.

4. A single character display chip, comprising:
   a) support layer;
   b) an unpatterned first conductor layer on the support layer;
   c) a layer of bistable cholesteric liquid crystal material located over the unpatterned first conductor layer, leaving a portion of the first conductor layer exposed for making electrical contact with the first conductor layer; and
   d) a patterned conductor layer defining a plurality of character elements located over the layer of bistable cholesteric liquid crystal material.

5. The single character display chip claimed in claim 4, wherein the single character chips are capable of displaying numbers between 0 and 9, a dollar sign, a cent sign, a slash and a decimal point.

6. A shelf talker for displaying short and longer term information, comprising:
   a) a backplane including a plurality of electrical conductors;
   b) a plurality of single character display chips mounted on the backplane in electrical contact with the electrical conductors for displaying the short term information, wherein at least one of the single character display chips is a display chip of claim 4; and
   c) a graphic overlay located over the backplane bearing the longer term information and defining apertures for displaying the short term information displayed by the character chips.

7. The shelf talker claimed in claim 6, wherein the single character chips are capable of displaying numbers between 0 and 9, a dollar sign, a cent sign, a slash and a decimal point.

8. The shelf talker claimed in claim 6, wherein the single character chips are mounted on the backplane with conductive adhesive.

9. The shelf talker claimed in claim 6, wherein the longer term information may include a universal product code (UPC).

10. The shelf talker claimed in claim 6, wherein the longer term information may include a product description.

11. The shelf talker claimed in claim 6, wherein the longer term information may include a unit price.

12. The shelf talker claimed in claim 6, wherein the longer term information may include a graphic logo.

13. A shelf talker display system, comprising:
   a) a shelf talker for displaying short and longer term information, the shelf talker including a backplane including a plurality of electrical conductors, a plurality of single character display chips mounted on the backplane in electrical contact with the electrical conductors for displaying the short term information, and a graphic overlay located over the backplane bearing the longer term information and defining apertures for displaying the short term information displayed by the character chips; and
   b) a shelf talker writer including an arrangement of electrical contacts for making contact with the electrical conductors, and a driver for applying drive signals to the electrical contacts to cause the display chips to display the short term information.

14. The shelf talker display system claimed in claim 13, further comprising a central computer for determining the short term information to be displayed by the shelf talker, and means for communicating the short term information to the shelf talker writer.

15. The shelf talker display system claimed in claim 13, wherein the single character chips are capable of displaying numbers between 0 and 9, a dollar sign, a cent sign, a slash and a decimal point.

16. The shelf talker display system claimed in claim 13, wherein the single character chips are mounted on the backplane with conductive adhesive.

17. The shelf talker display system claimed in claim 13, wherein the longer term information may include a universal product code (UPC).

18. The shelf talker display system claimed in claim 13, wherein the longer term information may include a product description.

19. The shelf talker display system claimed in claim 13, wherein the longer term information may include a unit price.

20. The shelf talker display system claimed in claim 13, wherein the longer term information may include a graphic logo.

21. The shelf talker display system claimed in claim 13, further comprising a printer for printing the longer term information on the graphic overlay.

22. The shelf talker display system claimed in claim 13, wherein the longer term information includes a universal product code (UPC), and further comprising a UPC reader for reading the UPC and using the UPC to locate the short term information to be displayed by the shelf talker.

23. The shelf talker display system claimed in claim 13, wherein the shelf talker writer further includes a digital camera for capturing an image of the information written by the shelf talker writer, and optical character recognition means for verifying that the written information is the desired information.

* * * * *